United States Patent [19]
Coutinho et al.

[11] Patent Number: 5,808,659
[45] Date of Patent: Sep. 15, 1998

[54] DEVICE AND METHOD FOR CENTRALIZED PROCESSING OF PICTURE-IN-PICTURE IMAGES

[75] Inventors: Roy S. Coutinho, Carmel, Ind.; James E. Dail, Marlboro; Miguel Dajer, Succasunna, both of N.J.; Hamid R. Rabiee, Hillsboro, Oreg.; Hayder S. Radha, Mahwah, N.J.

[73] Assignee: Lucent Technologies Inc., Murray Hill, N.J.

[21] Appl. No.: 799,059

[22] Filed: Feb. 10, 1997

[51] Int. Cl.$^6$ ....................................................... H04N 9/74
[52] U.S. Cl. ................................................. 348/7; 348/567
[58] Field of Search ..................... 348/564–568, 348/584, 586, 7

[56] References Cited

U.S. PATENT DOCUMENTS

| | | | |
|---|---|---|---|
| 4,656,516 | 4/1987 | Fling et al. ............................... | 348/565 |
| 4,821,086 | 4/1989 | McNelly et al. .......................... | 348/567 |
| 4,839,728 | 6/1989 | Casey ....................................... | 348/567 |
| 4,954,883 | 9/1990 | Belmares-Sarabis .................... | 348/584 |
| 5,396,296 | 3/1995 | Gallagher ................................. | 348/566 |

*Primary Examiner*—Mark R. Powell
*Assistant Examiner*—Reuben M. Brown

[57] ABSTRACT

An apparatus and method for centralized processing of PIP images from a plurality of digital video sources includes a centralized processing device having a plurality of service drivers for outputting digital video data representing full screen images, and samplers for selectively sampling the data from the service drivers to form reduced screen images. A PIP bus channels the sampled data for access by various users. The sample data is selectively stored in buffers and is output to a display device when triggered by input/output triggers. The triggered output data representing reduced screen images is then combined by a video switch to form picture-in-picture images.

13 Claims, 4 Drawing Sheets

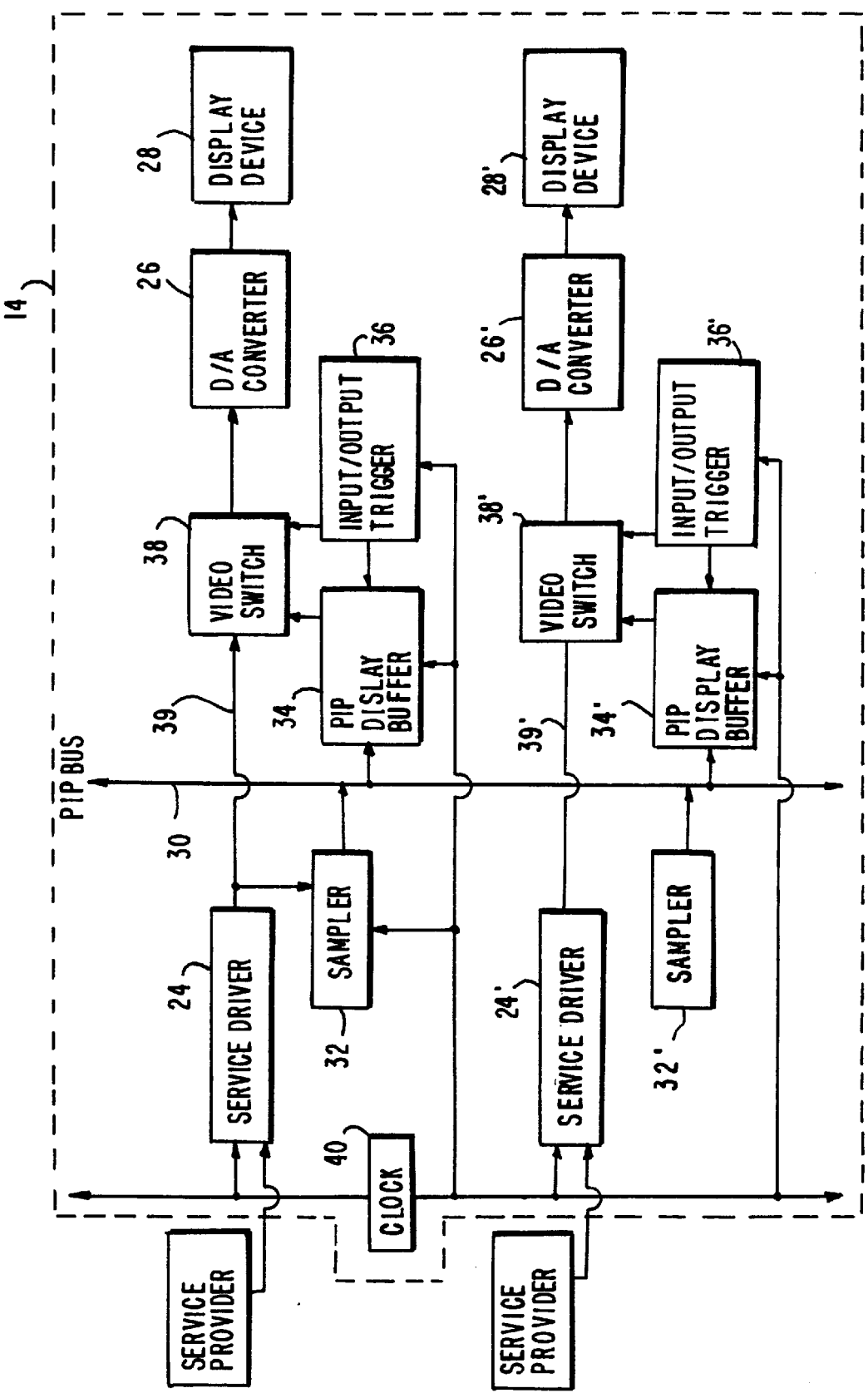

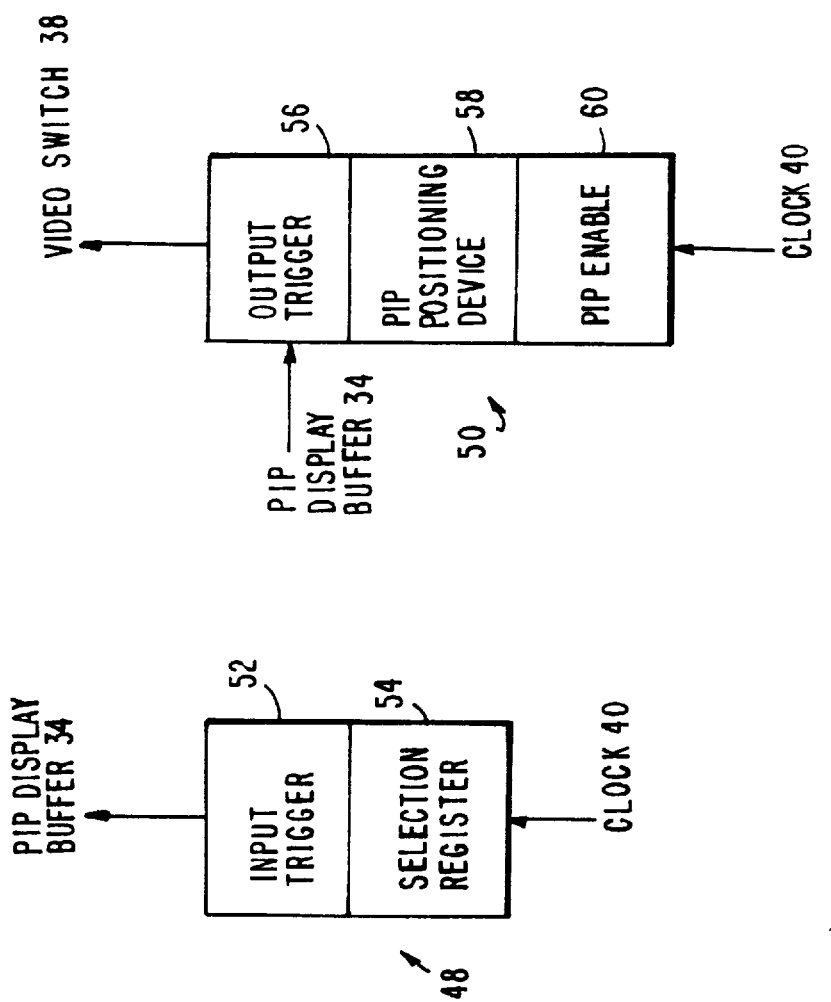
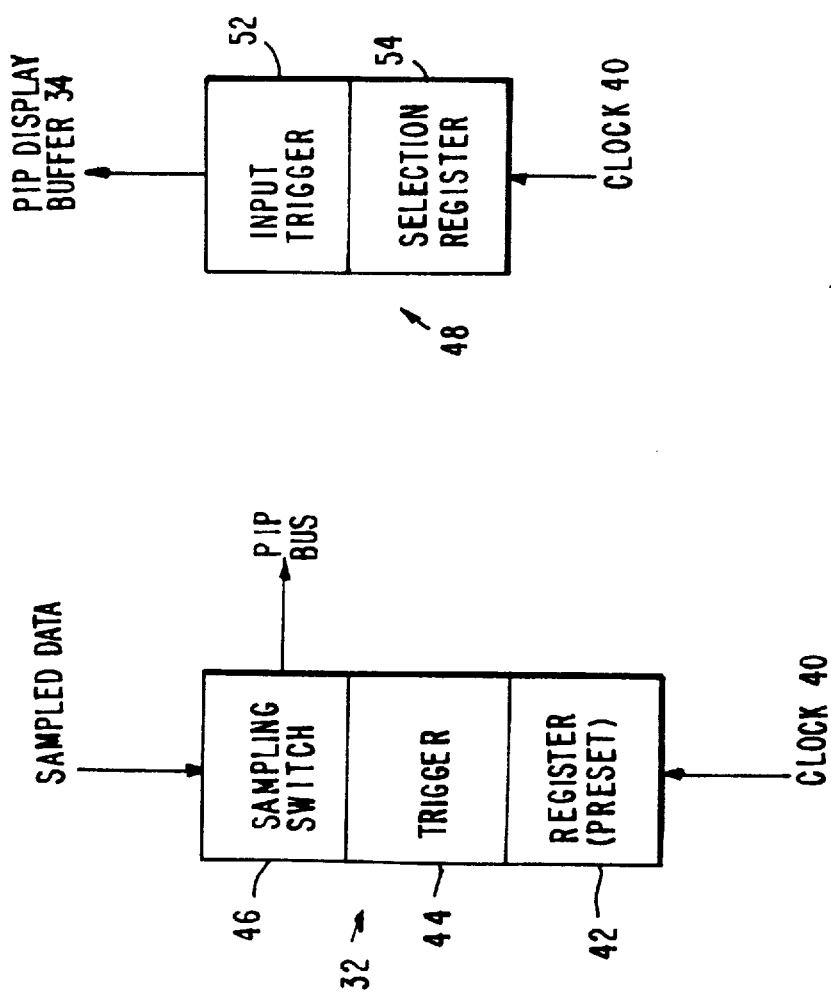

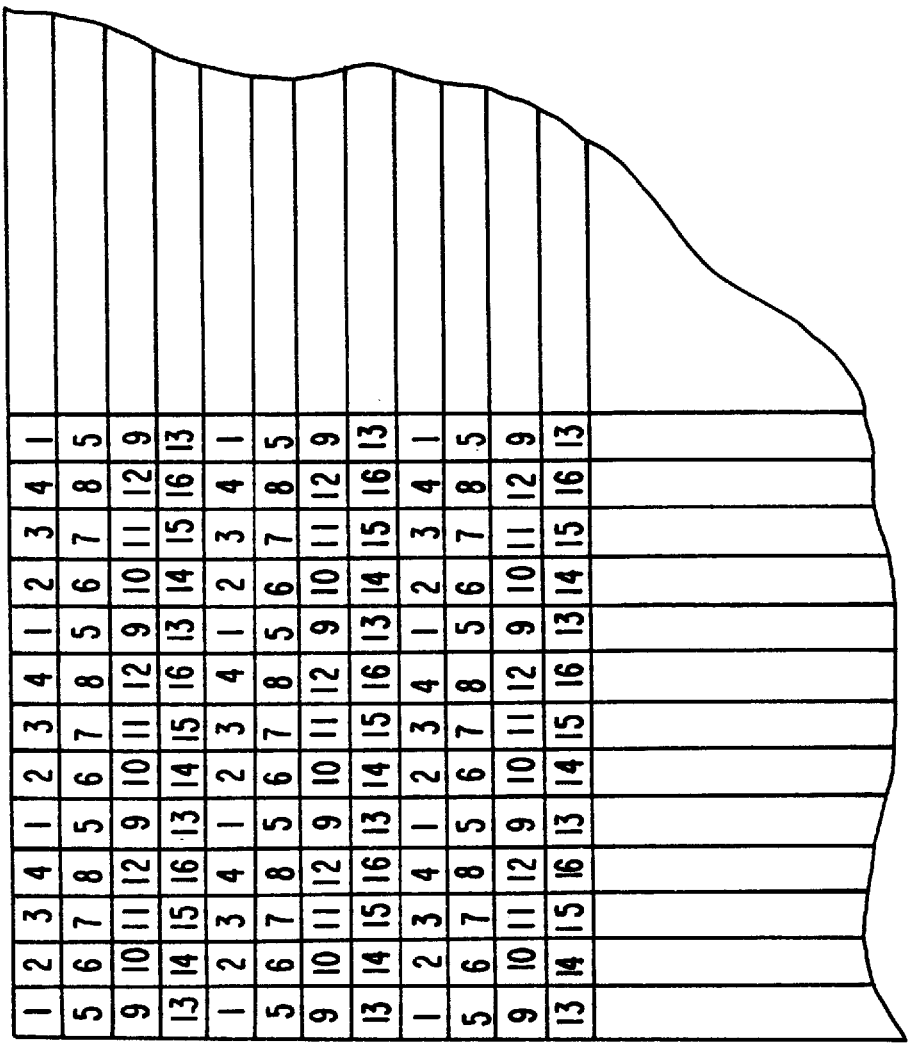

DEVICE AND METHOD FOR CENTRALIZED PROCESSING OF PICTURE-IN-PICTURE IMAGES

BACKGROUND OF THE INVENTION

1. Field of the Invention

The present invention is directed to a device and method for generating a picture-in-picture image on a display screen and, more particularly, to a device and method for centralized processing of reduced screen images from a plurality of video sources.

2. Description of the Related Art

More and more homes and businesses are now connected to cable or satellite television systems which offer subscribers a bewildering number of viewing channels. Some subscribers may be tempted or wish to view multiple channels at the same time. To view more than one channel simultaneously on a single display screen, the subscriber must purchase or have access to a television with a conventional "picture-in-picture" ("PIP") feature which costs substantially more than a television without the PIP feature.

The PIP image is operatively characterized by a small or reduced screen image that is inset within a full screen image. Typically, the full screen image is defined by signals from a first tuner and the reduced screen image is defined by signals from a second tuner.

In one exemplary prior art system, disclosed in U.S. Pat. No. 5,031,044, the PIP feature is based on a large digital memory which stores full screen image data (e.g. 512 pixel by 256 lines) and reduced screen image data. The size of the inset reduced screen image may be changed by programming the PIP circuitry to write smaller or larger inset picture fields into the memory. Such a system also allows a user to swap or interchange images between the first and second tuners.

One drawback of presently known systems is the exorbitant cost of providing each household member with a separate or independent PIP cable television as such television sets are sold at noticeably higher prices than those lacking such features. Another drawback is the vulnerability of such sets to timing or skewing errors which can occur when the incoming video signals are received from two different sources. These errors, manifested as jagged vertical edges, may occur even though the synchronizing signals, while within the tolerance limits of a particular signal standard (e.g., NTSC), have different frequencies, when the synchronizing signals precess in phase with respect to each other.

Still another drawback of present PIP capable televisions is that the PIP feature cannot be conveniently used with a set-top-box (STB) or cable converter which outputs video signals over a single channel such, for example, as channel 3 or 4. The STBs are typically supplied by a cable operator to subscribers to enable them to receive cable channels and to unscramble premium channels.

SUMMARY OF THE INVENTION

A presently preferred embodiment of a centralized PIP processing device for generating picture-in-picture images to a display device having a display screen in accordance with the invention, includes a first and a second video data source connected to the display device, the first video data source outputting a first stream of digital data representing pixels of full screen images to the display device, and the second video data source outputting a second stream of digital data representing pixels of full screen images to the display device. The first and second video data sources have a first and a second assigned service number, respectively. The centralized PIP processing device further includes a clock, connected to the first and second video data sources, for synchronizing output of the data streams of the first and the second video data sources and for generating a stream of clock pulses relating to displacement of pixels on the display screen. The clock pulses define repeating groups of clock states such that each of the assigned service numbers corresponds to one and only one clock state in each of the repeating groups of clock states. A sampler, connected to and synchronized by the clock, samples the first digital data stream when the first assigned service number matches its corresponding clock state and samples the second digital data stream when the second assigned service number matches its corresponding clock state. The sampled data of the first and second data streams forms a third data stream representing a combined set of pixels of reduced screen images of the first and second video data sources. A buffer, connected to the sampler, stores a portion of the third data stream representing at least a portion of a reduced screen image of one of the first and the second video data sources. A trigger, connected to the buffer and the clock and synchronized by the clock, triggers the input of a portion of the third data stream representing pixels of reduced screen images of one of the first and the second video data sources into the buffer when the clock state corresponds to the assigned service number of the selected one of the first and second video data sources. The trigger also activates the output of stored data from the buffer to the display device so as to produce a reduced screen image.

Other features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings, wherein like reference characters denote similar elements throughout the several views:

FIG. 1 depicts a schematic arrangement of a data distribution system having a centralized PIP processing device in accordance with the present invention;

FIG. 2 schematically illustrates a preferred embodiment of the centralized PIP processing device of FIG. 1;

FIG. 3 is a block diagram of the sampler of FIG. 2;

FIG. 4 is a block diagram of the input/output trigger of FIG. 2; and

FIG. 5 is a timing diagram of pixels on a PIP bus carrying the sampled data.

DETAILED DESCRIPTION OF THE PRESENTLY PREFERRED EMBODIMENTS

Figure 1:
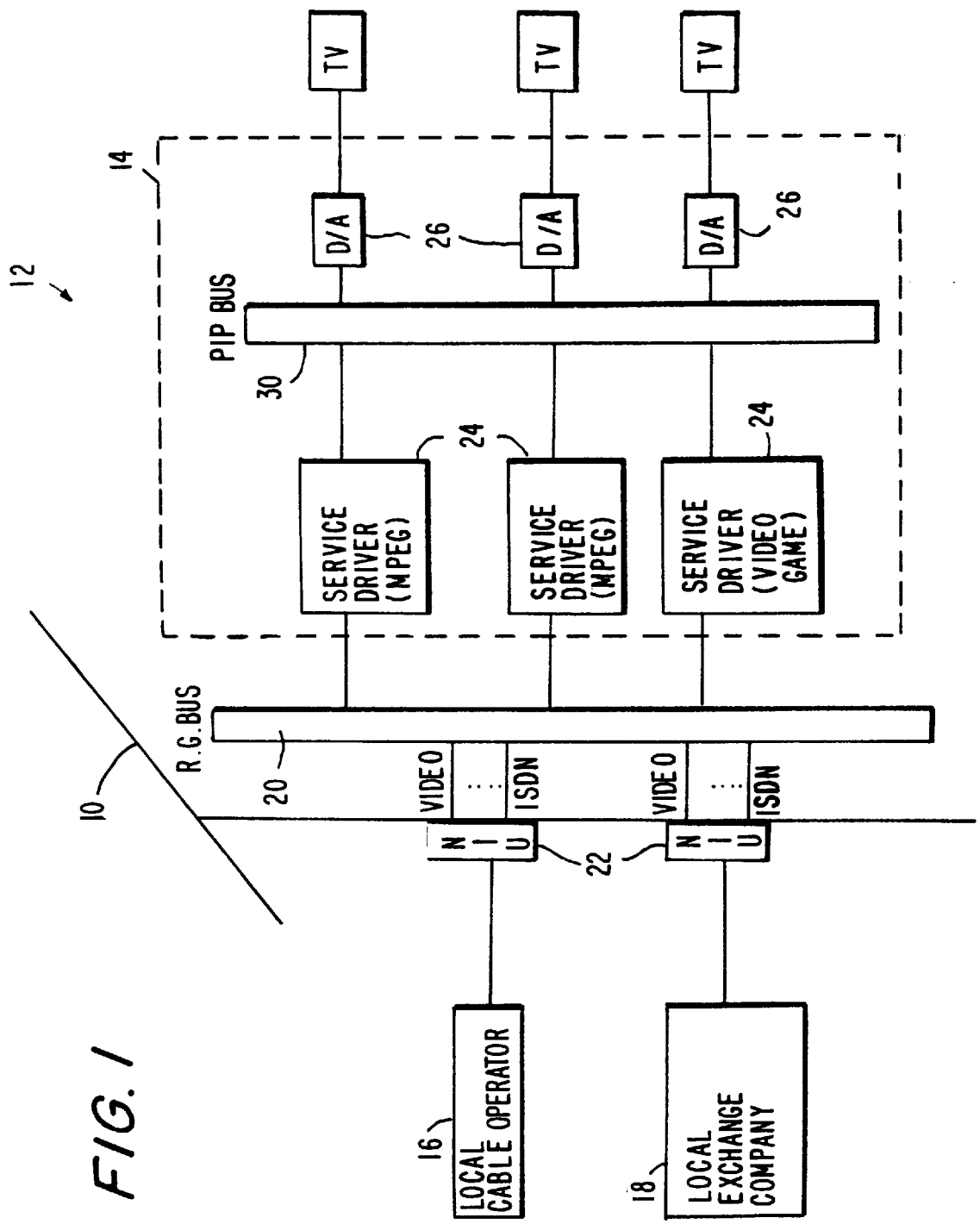

Referring now to FIG. 1, there is diagrammatically shown a residence or dwelling unit 10 equipped with a residential distribution system 12 in which a centralized PIP processing device 14 constructed in accordance with the present invention may be implemented. The distribution system 12 integrates and distributes information from various data sources or service providers such, for example, as the local cable operator 16 and local communication exchange company 18 to a plurality of users through the RG Bus 20. A network interface unit (NIU) 22, located at the upstream end of the system 12, receives and/or transmits data between the service provider and users in the dwelling unit 10. The data transmitted from the service provider may be in the form of analog data, digital data (typically compressed data), or hybrid data (i.e. a combination of digital and analog data). Where the service provider transmits analog or hybrid data, the NIU 18 demodulates the analog signals into compressed digital data at a rate of, for example, 6 Mbps prior to outputting the compressed data onto the RG Bus 20 for distribution to users in dwelling unit 10. In accordance with the present invention, the centralized PIP processing device 14 may include service drivers 24 such, for example, as video and audio decoders (e.g. MPEG) for receiving and decompressing the digital data from the RG bus 20 at rates up to, for example, approximately 200 Mbps. The decompressed data from the service drivers 24 is selectively sampled and channeled onto a PIP bus 30 for processing by users, as will be described in detail hereafter. Digital-to-analog (D/A) converters 26 may be provided to convert the digital video data into analog signals in accordance with an appropriate standard such as NTSC or the like. A modulator (not shown) may then modulate the analog signal to a suitable frequency for reception by a conventional television.

Shown in FIG. 2 is a preferred embodiment of the centralized PIP processing device 14 constructed in accordance with the present invention. The processing device 14 includes service drivers 24, 24' for decompressing and/or decoding audio and video data from each respective service provider or other video source. Preferably each service driver 24, 24' has a unique service number assigned thereto that may be preset by way of DIP switches or the like or in or through software at the time of installation. Also included in device 14 are -samplers 32, 32' for sampling the decompressed or decoded data at a predetermined sequence of time periods and for outputting a data stream representing pixels of a reduced screen image, and a PIP Bus 30 for channeling the sampled data stream from samplers 32, 32'. The inventive centralized PIP processing device 14 further includes PIP display buffers 34, 34' for storing portions of the sampled data representing the reduced screen images of a video source. Input/output triggers 36, 36' selectively retrieve, from the PIP bus 30, data representing reduced screen images from either one of the video sources into corresponding PIP display buffers 34, 34'. Input/output triggers 36, 36' selectively trigger output of the stored PIP data to form the reduced screen images. Video switches (or high speed digital switches) 38, 38', disposed downstream from their respective service drivers 24, 24', combine the un-sampled or main data stream in data lines 39, 39' with the data stream from PIP display buffers 34, 34' respectively so as to form the PIP images. The video switches for example may be in the form of a 20 pole, double-throw, digital switch actuatable by the input/output triggers 36, 36'. To accommodate situations in which the display device requires an analog signal input, D/A converters 26, 26' are provided upstream from the display device and downstream from the video switches 38, 38' for converting the digital PIP data into analog PIP signals.

Advantageously, the embodiment of FIG. 2 enables a user of display device 28 to concurrently view images from service drivers 24 and 24'. Likewise, user of display device 28' can concurrently see images from both service drivers 24 and 24'. The advantages of the inventive centralized PIP processing device 14 will be most appreciated if still additional service drivers and sources are connected to the PIP bus 30 to enable users to concurrently enjoy images from a rich and varied selection of video sources.

With continual reference to FIG. 2, the centralized PIP processing device 14 preferably includes a clock 40 for generating a stream of clock pulses relating to displacement of pixels on the display screen and for synchronizing data flow (e.g. data from service drivers 24, 24') and data control in device 14. Advantageously, clock 40 minimizes or substantially eliminates timing errors or skewing errors, permits proper sampling of pixel data from each service driver, and generally ensures that the aforementioned devices (such as the input/output trigger) perform the requisite functions at the appropriate times. Advantageously, according to one embodiment of the invention, the clock pulses of clock 40 define repeating groups of clock states such that each of the assigned service numbers of service drivers 24, 24' corresponds to one and only one clock state in each of the repeating groups of clock states. The service numbers may be assigned to each service driver by, for example, setting the value of a register associated with the service driver. The number of clock states is preferably equal to the number of service drivers 24 in device 14. For example, the clock of an embodiment with 16 service drivers preferably has 16 clock states or time slots.

The clock 40 may include four clock lines: a Pixel clock P (e.g. at about 12.2727 MHz under NTSC or, in a system triggered by leading edges, about 24.5454 MHz), a Horizontal clock H (e.g. at about 15.750 KHz under NTSC), a Vertical clock V (e.g. at about 59.98 Hz under NTSC), and a Frame clock F (e.g. at about 29.99 Hz under NTSC, which counts the odd and even fields). In accordance with the invention, other frequency values may be computed for other signal standards such as, for example, PAL and SECAM and for other scan patterns such as, for example, HDTV, VGA, and SVGA etc. It is presently preferred that one master clock be used and that all other clocks for other service drivers be slaved to the master clock. To avoid timing errors, the slave clocks should be located not more than a few feet from the master clocks.

FIG. 3 illustrates in further detail the sampler 32 of FIG. 2; sampler 32' will not be separately discussed as it is similar in construction to sampler 32. As schematically depicted, sampler 32 includes a register 42, a trigger 44 and a sampling switch 46. Register 42, which may be presetable, contains the service number of service driver 24 associated with register 42. The trigger 44 activates the sampling switch 46 when a clock state or time slot matches or corresponds to the service number of service driver 24. Upon activation, sampler 32 pulls the pixel data onto the PIP bus 30. A clock state corresponds to a service number when, for example, the value of the clock state is substantially the same as the value of the assigned service number. For example, service driver 24 having a service number with a value of 12 will have its pixel data sampled at each clock state "12".

FIG. 4 schematically illustrates in further detail the input/output trigger 36 of FIG. 2. As illustrated diagrammatically, the input/output trigger 36 includes an input trigger portion 48 and an output trigger portion 50. The input trigger portion 48 is connected to PIP display buffer 34 and clock 40 and includes an input trigger 52 and a selection register 54. The selection register 54, preferably programmable (remotely or otherwise) by the user, contains the service number of the service driver 24 selected by the user for PIP viewing. When the clock state matches the service number contained in the selection register 54, the pixel data of the selected service driver is pulled from the PIP bus 30 and into the PIP display buffer 34. The output trigger portion 50 is connected to the clock 40, the PIP display buffer 34, and the video switch 38 and includes an output trigger 56, a PIP ENABLE 60, and a PIP positioning device 58. The PIP positioning device 58 generally includes a counter (not shown) for counting the pixel positions for display on the display screen and a position register (not shown) containing the desired screen position at which the leftmost pixel of a horizontal line of the reduced screen image is displayed. The position register may be programmable by the user or preset with DIP switches or through software at the time of installation. According to a presently preferred embodiment, when PIP ENABLE 60 is enabled and when the pixel position count reaches the selected screen position, the output trigger 56 causes the video switch 38 to switch from the un-sampled or main video data stream to the display buffer output and dump one horizontal line of the reduced screen image to the screen of the display device. The output trigger 56 then resets and waits for the corresponding pixel position count for the next line. When the pixel position count again matches the selected screen position, the output trigger 56 actuates video switch 38 to dump another line of pixels to the screen. Preferably, each time the output trigger 56 dumps a line of pixels it checks to determine whether it has done this N times, N being the total number of horizontal lines in the reduced screen image. If the last line has not been reached, then it increments the line count in a line counter (not shown) and waits for the next line. If it has already received N lines, then it stops the process as it has completed one PIP field. It then waits for the next frame reset.

In a currently preferred embodiment, the centralized PIP processing device 14 includes 16 service drivers wherein each of the service drivers 24 is assigned a unique service number from 1 to 16. The clock 40, formed by the P, H, V and F clock lines, is divided into 16 or 4×2×2 clock states or time slots (having values of 1 through 16) by assigning four states to clock line P which is enabled on pixel 1, 2, 3, or 4; two states to clock line H which is enabled on odd or even lines; and two states to clock line V which is enabled on the first or second field. Clock line F resets all counts at the start of a frame.

Depicted in FIG. 5 is a timing diagram of sampled pixels on the PIP bus 30 in accordance with the aforementioned preferred embodiment having 16 service drivers. Each numbered pixel in the diagram represents the pixel pulled from the correspondingly numbered service driver. The positions of the numbered pixels in the diagram are the same as those pixels identically positioned in a full screen image of the correspondingly numbered service driver. Thus, for example, the pixel number 1 disposed first from the left on the first horizontal line in FIG. 5 is the same pixel disposed at a like location of a full screen image of the number 1 service driver. For another example, the number 16 pixel disposed fourth from the left on the fourth horizontal line of a full screen image of the number 16 service driver is the same pixel disposed at a like location of a full screen image of the number 16 service driver. In accordance with this embodiment, the reduced screen image of each service driver is 1/16th the size of the full screen image, i.e. a screen image reduction of 16:1 is achieved. Similarly, an embodiment with four service drivers employing the above timing or sampling scheme will achieve a screen image reduction of 4:1.

In operation, a user of the preferred 16-service-driver embodiment can access any one of the reduced screen images generated by the sixteen service drivers by selecting the desired service driver and enabling the PIP ENABLE switch. For example, a user viewing display device 28 may optionally select the screen position at which the PIP is to be displayed, if such a feature is provided. As these selections are made, the following events occur: (1) the PIP ENABLE trigger is enabled, (2) the service number of the desired service driver is loaded into the selection register 54 of the input trigger 48, (3) a screen position number is loaded into the PIP positioning device 58, (4) the input trigger 52 begins to pull data from the PIP bus 30 and to load it into the PIP display buffer 34, and (5) at the selected screen position, the output trigger 56 triggers the video switch to combine the reduced screen image from the PIP display buffer 34 with the full screen image so as to produce a PIP image wherein the image of service driver 24' is inset within the image of service driver 24.

The commands or selections of the user are preferably generated or input by way of a remote control with which the user selects the desired parameters from a menu displayed on the TV screen and the TV then generates computer packets on a control channel (which may be the default) for transfer to the programmable registers of the centralized PIP processing device.

It is contemplated that the inventive centralized PIP processing device 14 may be configured to provide PIP images from more than one service driver by, for example, connecting the output of a plurality of PIP display buffers to the same video switch. In this manner the display screen will contain a full screen image with several reduced screen images inset therewithin. It is further contemplated that the centralized PIP processing device 14 may be configured to display only reduced screen images from all PIP display buffers so as to achieve "split-screen" effects; the images may either be overlapping or non-overlapping as a function of user preference. This modified embodiment of the centralized PIP processing device may also include linking of the outputs of all PIP display buffers to an input/output trigger and outputting data of reduced screen images to the display at preselected screen positions. It is still further contemplated that instead of producing PIP images through the use of a digital video switch, the PIP images may also be constructed by way of an analog video switch. One exemplary embodiment includes an analog video switch disposed downstream of the D/A converter 26 and an additional D/A converter interposed between an output of the PIP display buffer 34 and an input to the analog video switch.

Although the present invention may as described be used in a dwelling unit, it is also contemplated that the centralized PIP processing device be employed in any environment in which a plurality of video sources are networked or interconnected by a digital data distribution system.

Thus, while there have been shown and described and pointed out fundamental novel features of the invention as applied to preferred embodiments thereof, it will be understood that various omissions and substitutions and changes in the form and details of the devices illustrated, and in their operation may be made by those skilled in the art without departing from the spirit of the invention. It is the intention, therefore, to be limited only as indicated by the scope of the claims appended hereto.

What is claimed is:

1. A centralized PIP processing device for generating picture-in-picture images to a display device having a display screen, comprising:

means connecting a first and a second video data source to the display device, the first video data source outputting a first stream of digital data representing pixels of full screen images to the display device, and the second video data source outputting a second stream of digital data representing pixels of full screen images to the display device, the first and second video data sources having a first and a second assigned service number, respectively;

a clock, connected to said connecting means for first and second video data sources, for synchronizing output of the data streams of the first and second video data sources and for generating a stream of clock pulses relating to displacement of pixels on the display screen, said clock pulses defining repeating groups of clock states defined so that each of said assigned service numbers corresponds to one and only one of the clock states in each of said repeating groups of clock states;

a sampler, connected to and synchronized by said clock, for sampling the first digital data stream when said first assigned service number matches the clock state and for sampling the second digital data stream when said second assigned service number matches the clock state, said sampled data of said first and said second data streams forming a third data stream representing a combined set of pixels of reduced screen images of said first and second video data sources;

a buffer connected to said sampler for storing a portion of the third data stream representing at least a portion of a reduced screen image of one of the first and said second video data sources; and a trigger connected to said buffer and said clock for triggering input to said buffer of a portion of the third data stream representing pixels of reduced screen images of one of the first and second video data sources when the clock state corresponds to a selected one of said assigned service numbers and, for triggering output of stored data from said buffer to the display device so as to produce on the display device a reduced screen image of the said one of the first and second video data sources.

2. The processing device of claim 1, further comprising a switch for selectively switching data between one of the first and second data streams and said triggered output of stored data from the buffer so as to produce a picture-in-picture image.

3. The processing device of claim 1, wherein said trigger further includes a positioning device for selectively positioning the reduced screen image within the full screen image displayed in the display device.

4. The processing device of claim 1, wherein said switch comprises a video switch.

5. The processing device of claim 1, wherein said trigger further includes selecting means responsive to the user for inputting said selected one of the assigned service numbers.

6. The processing device of claim 1, wherein said selecting means comprises a selection register.

7. The processing device of claim 1, wherein each of the first and second video data sources comprises a service driver.

8. The processing device of claim 1, further comprising a bus for channeling said third data stream.

9. The processing device of claim 1, wherein said assigned service numbers and said clock states are represented by numerical values.

10. The processing device of claim 8, wherein an assigned service number matches a clock state when a numerical value of the assigned service number and a numerical value of the clock state are substantially the same.

11. A method for centralized processing of PIP images to a display device having a display screen, comprising:

receiving a first stream of digital data representing pixels of full screen images from a first video data source;

receiving a second stream of digital data representing pixels of full screen images from a second video data source;

assigning a first and a second service number to the first and second video data sources respectively;

generating in a clock a stream of clock pulses relating to displacement of display pixels and for synchronizing the first and second data streams of the first and second video data sources;

defining the generated clock pulses into repeating groups of clock states such that each of the assigned service numbers corresponds to one and only one clock state in each of the repeating groups of clock states;

sampling the first digital data stream when the first assigned service number matches the clock state and sampling the second digital data stream when the second assigned service number matches the clock state, the sampled data of the first and second data streams forming a third data stream representing a combined set of pixels of reduced screen images of the first and second video data sources;

storing a portion of the third data stream representing at least a portion of a reduced screen image of one of the first and second video data sources such that a portion of the third data stream representing pixels of reduced screen images of one of the first and second video data sources is stored when the clock state matches the assigned service number of the said one of the first and second video data sources; and triggering an output of the stored data portion to the display device so as to produce a reduced screen image.

12. The method of claim 11, further comprising the step of combining the triggered output of stored data with one of the first and second data streams so as to produce a picture-in-picture image.

13. A method for generating picture-in-picture images from a plurality of digital video sources to a display device, comprising the steps of:

outputting from a first digital service driver a first stream of digital data representing pixels of full screen images from a first video source at a predetermined sequence of time periods;

outputting from a second digital service driver a second stream of digital data representing pixels of full screen images from a second video source at said predetermined sequence of time periods;

sampling successively the first and second data streams from said first and said second digital service drivers at said predetermined sequence of time periods to generate a third data stream representing a combined set of pixels from the first and second video sources, said combined set of pixels including a reduced number of pixels from each of said first and second digital service drivers;

selecting from the third data stream sampled data of one of the first and second video data sources;

storing a portion of the selected sampled data from the third data stream;

triggering output of the stored data so as to produce a reduced screen image of the selected one of the first and second video sources; and combining the triggered output of the stored data with one of the first and second data streams so as to produce a picture-in-picture image on the display device.

\* \* \* \* \*